(12) United States Patent
Lee et al.

(10) Patent No.: US 12,187,416 B2
(45) Date of Patent: Jan. 7, 2025

(54) RETRACTABLE LANDING GEAR LINKAGE WITH ELECTROMAGNETIC DOWNLOCK

(71) Applicant: SAFRAN LANDING SYSTEMS CANADA INC., Ajax (CA)

(72) Inventors: Randy Lee, Oshawa (CA); Zoran Pasic, Etobicoke (CA); Michael Saccoccia, Seagrave (CA)

(73) Assignee: Safran Landing Systems Canada Inc., Ajax (CA)

( * ) Notice: Subject to any disclaimer, the term of this patent is extended or adjusted under 35 U.S.C. 154(b) by 80 days.

(21) Appl. No.: 18/310,394

(22) Filed: May 1, 2023

(65) Prior Publication Data
US 2024/0367779 A1    Nov. 7, 2024

(51) Int. Cl.
| | | |
|---|---|---|
| B64C 25/20 | (2006.01) | |
| B64C 25/26 | (2006.01) | |
| B64C 25/58 | (2006.01) | |
| H01F 7/02 | (2006.01) | |
| H01F 7/08 | (2006.01) | |

(52) U.S. Cl.
CPC ............ B64C 25/20 (2013.01); B64C 25/26 (2013.01); B64C 25/58 (2013.01); H01F 7/02 (2013.01); H01F 7/081 (2013.01)

(58) Field of Classification Search
CPC ................ B64C 25/001–30; B64U 60/40
See application file for complete search history.

(56) References Cited

U.S. PATENT DOCUMENTS

| | | |
|---|---|---|
| 8,109,465 B1 | 2/2012 | Heer |
| 2024/0059401 A1* | 2/2024 | Luxmoore ............. B64U 60/30 |

FOREIGN PATENT DOCUMENTS

| | | | |
|---|---|---|---|
| CN | 116853498 A | * 10/2023 | |
| WO | WO-2019128446 A1 | * 7/2019 | ............. B64C 25/26 |

OTHER PUBLICATIONS

Merged translation of CN 116853498 A (Year: 2023).*
Merged translation of WO 2019128446 A1 (Year: 2019).*

* cited by examiner

Primary Examiner — Philip J Bonzell
Assistant Examiner — Colin Zohoori
(74) Attorney, Agent, or Firm — CHRISTENSEN O'CONNOR JOHNSON KINDNESS PLLC

(57) ABSTRACT

A landing gear system for a vehicle includes a landing gear configured for reciprocating motion between a stowed position and a deployed position. The landing gear has a linkage with a first link rotatably coupled to a second link. The linkage reciprocates between folded and extended states when the landing gear reciprocates between the stowed and deployed positions, respectively. A fail-secure downlock includes first and second electromagnets fixedly positioned relative to the first and second links, respectively. The first electromagnet is proximate to the second electromagnet when the landing gear is in the stowed position. The first electromagnet is attracted to the second electromagnet when the downlock is in the locked state. The first electromagnet is repelled by the second electromagnet when the downlock is in the unlocked state.

15 Claims, 10 Drawing Sheets

RETRACTABLE LANDING GEAR LINKAGE WITH ELECTROMAGNETIC DOWNLOCK

BACKGROUND

Modern aircraft landing gear is typically retractable, i.e., reciprocal between a deployed position and a stowed position. In the deployed position, the landing gear extends downward from the aircraft to engage a ground surface and support the aircraft during takeoff, landing, and taxiing maneuvers. To improve aerodynamic efficiency, the landing gear is retracted to the stowed position when the aircraft is in flight. More specifically, the landing gear is stowed within a landing gear bay of the wing and/or the fuselage of the aircraft during flight.

Maglev vehicles are also known to use retractable landing gear in a similar manner to support the vehicle at a docking station while limiting drag when the vehicle is travelling in the levitated state.

FIGS. 1-3 show an example of a known retractable landing gear assembly 100 for an aircraft, wherein FIG. 1 shows the assembly in a deployed (extended) state; FIG. 2 shows the assembly between the deployed position a stowed (retracted) state; and FIG. 3 shows the assembly in the stowed state. As described in further detail, the landing gear assembly 100 includes a known drag brace assembly 120 and associated locking link assembly 130.

The landing gear assembly 100 (referred to hereafter as "the landing gear" or "the landing gear 100") includes a shock strut 102, one end of which is rotatably coupled about an axis 300 to the airframe (not shown). The shock strut 102 includes a piston 104, a portion of which is slidingly disposed within a cylinder 106. One or more wheels 108 are rotatably associated with the shock strut 102 so that the wheels are in rolling engagement with the ground when the landing gear 100 is extended and supporting the vehicle. A torque link assembly 110 is connected at one end to the piston 104 and at the other end to the cylinder 106 to prevent rotation of the piston and associated wheel(s) 108 relative to the cylinder.

A linear actuator 112 is coupled at one end to the airframe. A second end of the actuator 112 is rotatably coupled to the cylinder 106, directly or indirectly. Extension of the actuator 112 rotates the shock strut 102 about axis 300 in a clockwise direction (as shown in FIGS. 1-3) to move the landing gear 100 toward the stowed position. Conversely, retraction of the actuator 112 rotates the shock strut 102 about axis 300 in a counter-clockwise direction (as shown in FIGS. 1-3) to move the landing gear 100 toward the deployed position.

The landing gear 100 includes a drag brace assembly 120 that has an elongate upper drag brace 122 rotatably mounted to the aircraft about an axis 306. The drag brace assembly 120 further includes an elongate lower drag brace 124 rotatably mounted to the cylinder 106 about an axis 302, which is parallel to axis 306. The upper drag brace 122 is rotatably coupled to the lower drag brace 124 about an axis 304 so that the upper and lower drag braces form a foldable linkage. As best shown in FIG. 1, when the landing gear 100 is in the extended state, the upper drag brace 122 and lower drag brace 124 are aligned, i.e., the drag braces form an angle of approximately 180°. In the extended state, the drag brace assembly 120 extends upwardly at an angle from the shock strut 102 to the airframe and reacts drag forces from the ground to the airframe.

Still referring to FIGS. 1-3, the landing gear 100 includes a foldable locking link assembly 130 that downlocks the drag brace assembly 120 in the extended position when the landing gear is deployed. The locking link assembly 130 includes an elongate upper locking link 132 configured for rotation at a first end about axis 308. A second end of the upper locking link 132 is rotatably coupled at a second end to a first end of a lower locking link 134 about axis 310. The second end of the lower locking ling 134 is rotatably coupled to the drag brace assembly 120 about axis 304, i.e., the axis about which the upper and lower drag braces 122, 124 are coupled to each other.

As shown in FIG. 1, when the landing gear 100 is deployed and supporting the aircraft, the drag brace assembly 120 is fully extended in straight. The locking link assembly 130 is also straight and prevents the drag brace assembly 120 from folding about axis 304. The locking link assembly 130 to is held in place by a locking link actuator 136 and/or extension/compression spring(s) (not shown).

In order to retract the landing gear, when the aircraft is safely off the ground, the locking link actuator 136 rotates the upper locking link 132 in a clockwise direction as shown in FIG. 1. Rotation of the upper locking link 132 begins to fold the locking link assembly 130, which unlocks the drag brace assembly 120. This folding motion, in combination with extension of the landing gear actuator 112 starts to fold the drag brace assembly 120 about its apex at axis 304 so that the landing gear 100 can retrace toward the stowed position.

Landing gear lock mechanisms and the locking performance are critical to the safe and reliable operation of the landing gear system. Known landing gear locking link assembly configurations have inherent drawbacks. Failure or jamming of the locking link assembly 130 has the potential to prevent deployment of the landing gear 100, which would result in a gear-up landing. Inadvertent unfolding of the locking link assembly 130 while the gear is on the ground can lead to a catastrophic end of mission. In addition to introducing potential failure modes, known landing gear locking link assemblies 130 also add undesirable weight, complexity and cost to the retractable landing gear.

SUMMARY

Embodiments of retractable landing gear linkages with electromagnetic downlocks are set forth below according to technologies and methodologies of the present disclosure. The downlocks are configured such one or more power failures will not result in the uncommanded release of the downlock assembly. Further, the downlocks selectively provide attractive and repelling forces that assist in the retraction and extension, respectively, of the landing gear.

While the present disclosure describes various embodiments of retractable landing gear for aircraft, it will be appreciated that the use of such landing gear is not limited to aircraft, and that other implementations, such as on maglev vehicles or any other suitable vehicles, should be considered within the scope of the present disclosure.

A first representative embodiment of a landing gear system for a vehicle includes a landing gear coupled to a body of the vehicle and configured for reciprocating motion between a stowed position and a deployed position. The landing gear has a linkage with a first link rotatably coupled to a second link, the linkage being configured to reciprocate between a folded state when the landing gear is in the stowed position and an extended state when the landing gear is in the deployed position. The landing gear system further includes a fail-secure downlock reciprocal between a locked state and an unlocked state. The downlock has a first electromagnet fixedly positioned relative to the first link, the first electromagnet including a first solenoid configured to generate a first electromagnetic field with a reversible polarity and a first permanent magnet. The downlock also has a second electromagnet fixedly positioned relative to a second link, the second electromagnet including a second solenoid configured to generate a second electromagnetic field with a reversible polarity and a second permanent magnet. The first electromagnet is proximate to the second electromagnet when the landing gear is in the stowed position, the first permanent magnet being attracted to the second permanent magnet, the first solenoid being attracted to the second solenoid when the downlock is in the locked state, the first solenoid being repelled by the second solenoid when the downlock is in the unlocked state.

In any embodiment, the linkage is a drag brace rotatably coupled at a first end to the vehicle and at a second end to a landing gear component.

In any embodiment, the downlock maintains the drag brace in an extended position when the downlock is in the locked state, the landing gear being prevented from moving toward the retracted position when the drag brace is in the extended state.

In any embodiment, the downlock urges the drag brace toward the folded state when the downlock is in the unlocked state.

In any embodiment, the landing gear system further comprises a controller in operable communication with the first and second electromagnets, the controller being programmed to reverse a current supplied to one of the first and second electromagnets to move the downlock from the locked state to the unlocked state.

In any embodiment, the downlock urges the drag brace toward the folded state when the downlock is in the unlocked state.

In any embodiment, the landing gear includes a drag brace rotatably coupled at a first end to the vehicle and at a second end to a landing gear component. The drag brace reciprocates between a folded position when the landing gear is in the stowed position and an extended position when the landing gear is in the deployed position. In these embodiments, the linkage is a locking link assembly coupled to the drag brace, wherein the locking link assembly prevents movement of the drag brace toward the folded position when the downlock is in the locked state.

In any embodiment, the locking link assembly urges the drag brace toward the folded position when the downlock is in the unlocked state.

In any embodiment, the landing gear system further comprises a controller in operable communication with the first and second electromagnets, the controller being programmed to reverse a current supplied to one of the first and second electromagnets to move the downlock from the locked state to the unlocked state.

In any embodiment, the downlock urges the drag brace toward the folded position when the downlock is in the unlocked state.

In any embodiment, the first electromagnet repels the second electromagnet when the landing gear is in the deployed position and the downlock is in the unlocked state.

Another embodiment of a landing gear assembly for a vehicle having a fuselage is provided. The assembly includes a shock strut mounted to the fuselage for reciprocating movement between a stowed position and a deployed position and a drag brace having a first link rotatably coupled to a second link. An end of the first link is rotatably coupled to the shock strut and an end of the second link is rotatably coupled to the fuselage. The drag brace reciprocates between an extended state when the shock strut is in the deployed position and a folded state when the shock strut is in the stowed position. The landing gear assembly further includes a downlock configured to selectively retain the shock strut in the deployed position. The downlock has a first electromagnet and a first permanent magnet mounted to the first link and a second electromagnet and a second permanent magnet mounted to the second link. The downlock further includes a power source configured to provide an electrical current to the first and second electromagnets and a controller programmed to selectively control a direction and power of the electrical current supplied to each of the first and second electromagnets. The first and second electromagnets are attracted to each other when the downlock is in a locked state, and the first and second electromagnets are repelled from each other when the downlock is in an unlocked state.

In any embodiment, the first and second permanent magnets are attracted to each other, and a force repelling the first and second electromagnets is greater than a force attracting the first and second permanent magnets when the shock strut is in the deployed position and the downlock is in the unlocked state.

Another embodiment of a landing gear system for a vehicle is provided. The assembly includes a landing gear coupled to a body of the vehicle and configured for reciprocating motion between a stowed position and a deployed position. The landing gear has a linkage with a first link rotatably coupled to a second link. The linkage is configured to reciprocate between a folded state when the landing gear is in the stowed position and an extended state when the landing gear is in the deployed position. The assembly further includes a fail-secure downlock reciprocal between a locked state and an unlocked state. The downlock has a first electromagnet that is fixedly positioned relative to the first link and includes a first solenoid configured to generate a first electromagnetic field with a reversible polarity and a first permanent magnet. The downlock also has a second permanent magnet fixedly positioned relative to a second link and proximate to the first electromagnet when the landing gear is in the deployed position. The first permanent magnet is attracted to the second permanent magnet. The first solenoid is attracted to the second permanent magnet when the downlock is in the locked state, and the first solenoid is repelled by the second permanent magnet when the downlock is in the unlocked state.

In any embodiment, when the downlock is in the unlocked state, a repelling force between the first solenoid and the second permanent magnet is greater than an attracting force between the first and second permanent magnets.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the disclosed subject matter will become more readily appreciated as the same become better understood by reference to the following detailed description, when taken in conjunction with the accompanying drawings, wherein.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Examples of landing gear assemblies for vehicles are set forth below according to technologies and methodologies of the present disclosure. In any embodiment, a landing gear includes drag brace assembly downlocked by a pair of selectively energized electromagnets. In any embodiment, the electromagnets are mounted to the drag brace links of a drag brace assembly. In any embodiment, the electromagnets are mounted to the locking links of a locking link assembly. As will be described in further detail, the electromagnets are configured to provide a fail-secure locking mechanism that maintains the locked state in the event of a power failure. In any embodiment, the polarity of the electromagnets is selectively reversible so that the downlock is capable of providing an attractive force or a repellant force.

Figure 3:
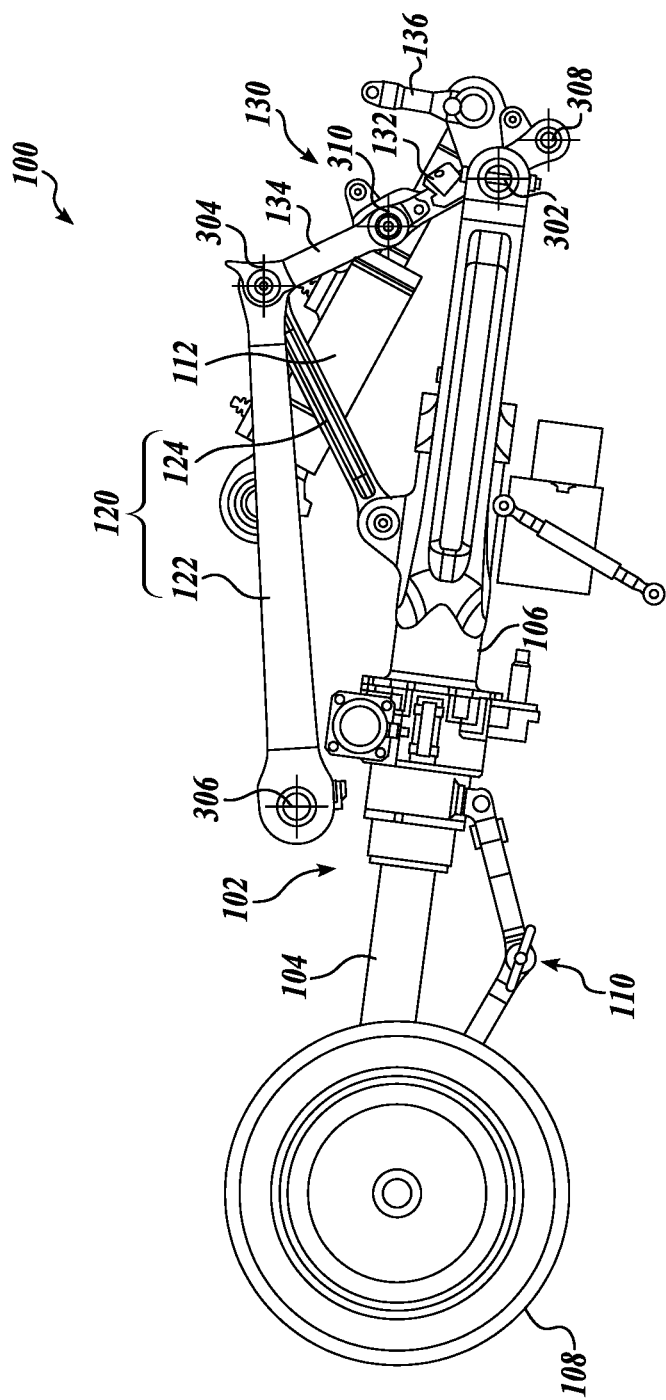
FIG. 3 shows a side view of the landing gear of FIG. 1, wherein the landing gear is in the stowed position.
Figure 4:
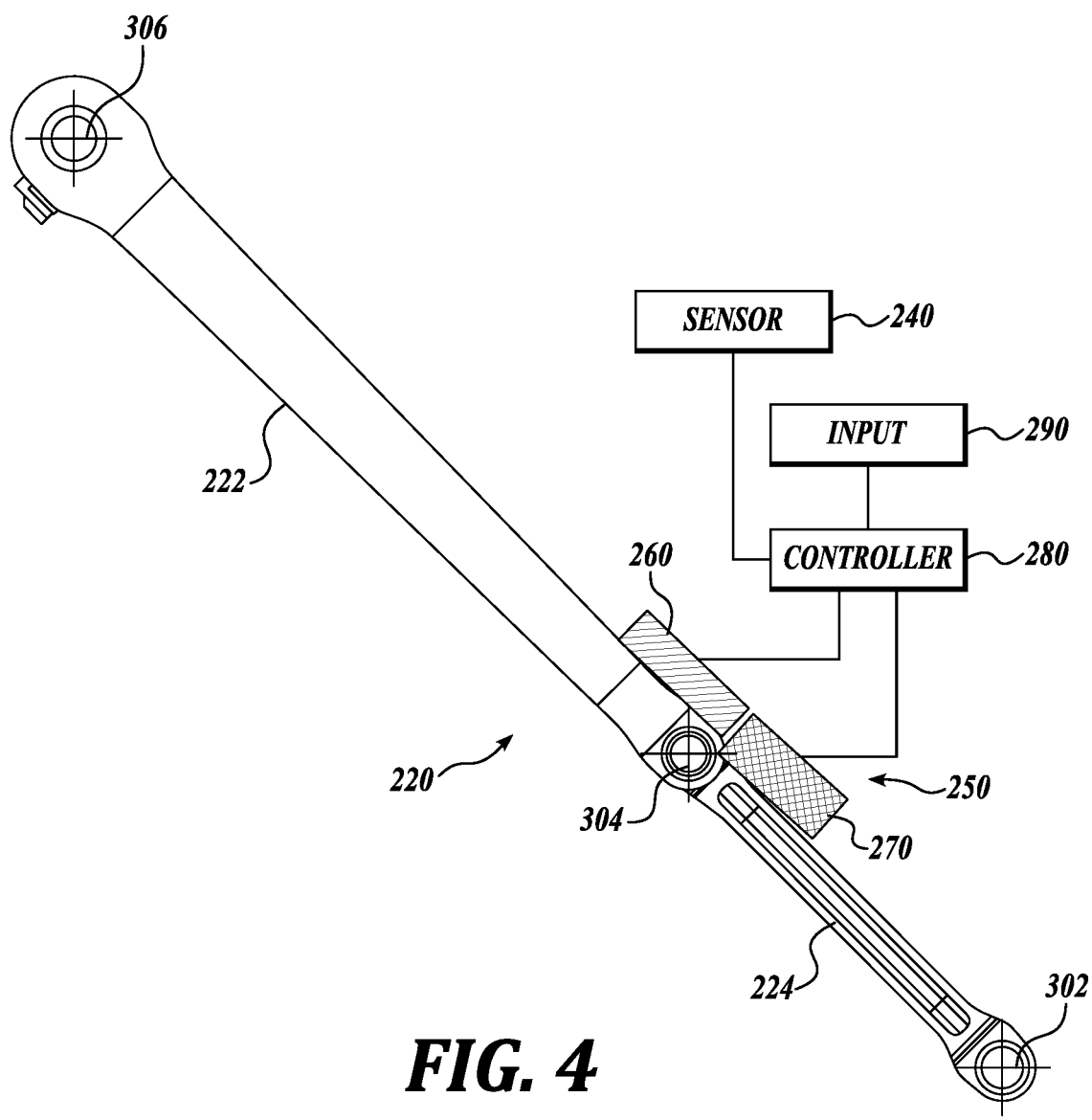
FIG. 4 shows a partially schematic side view of a representative embodiment of a drag brace assembly for a retractable landing gear according to aspects of the present disclosure, wherein the drag brace assembly is in a downlocked position corresponding to the landing gear being in the extended position of FIG. 1.
Figure 5:
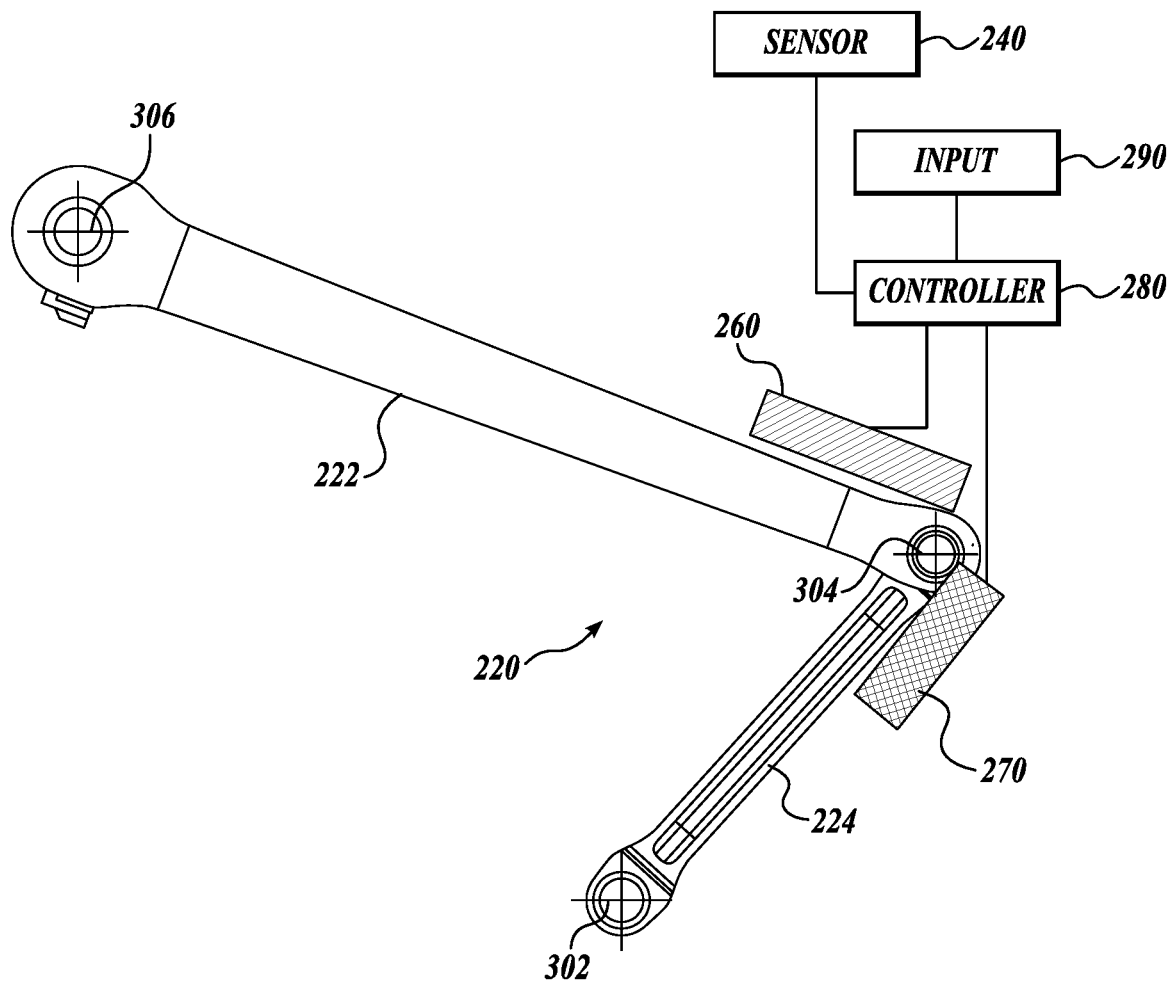
FIG. 5 shows a partially schematic side view of the drag brace assembly of FIG. 4, wherein the drag brace assembly is in a folded position corresponding to the landing gear being in the retracted position of FIG. 3.

FIGS. 4 and 5 show a representative embodiment of a drag brace assembly 220 with a downlock according to aspects of the present disclosure. In any embodiment, the drag brace assembly 220 is suitable for use on the landing gear 100 of FIGS. 1-3 as a replacement for the illustrated drag brace assembly 120 and locking link assembly 130 of FIGS. 1-3.

Figure 1:
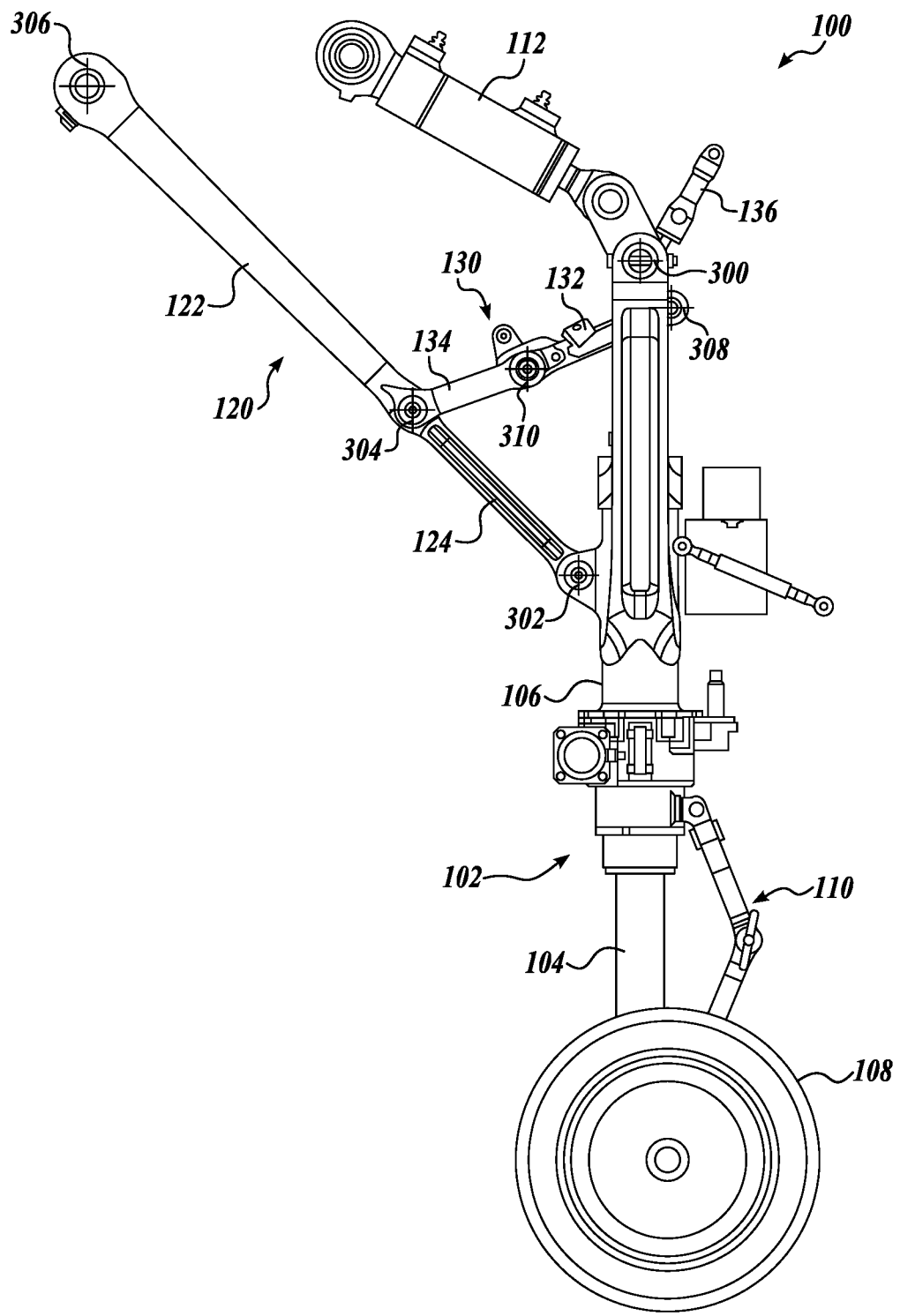
FIG. 1 shows a side view of a retractable landing gear with a known downlock, wherein the landing gear is in a deployed position.
Figure 2:
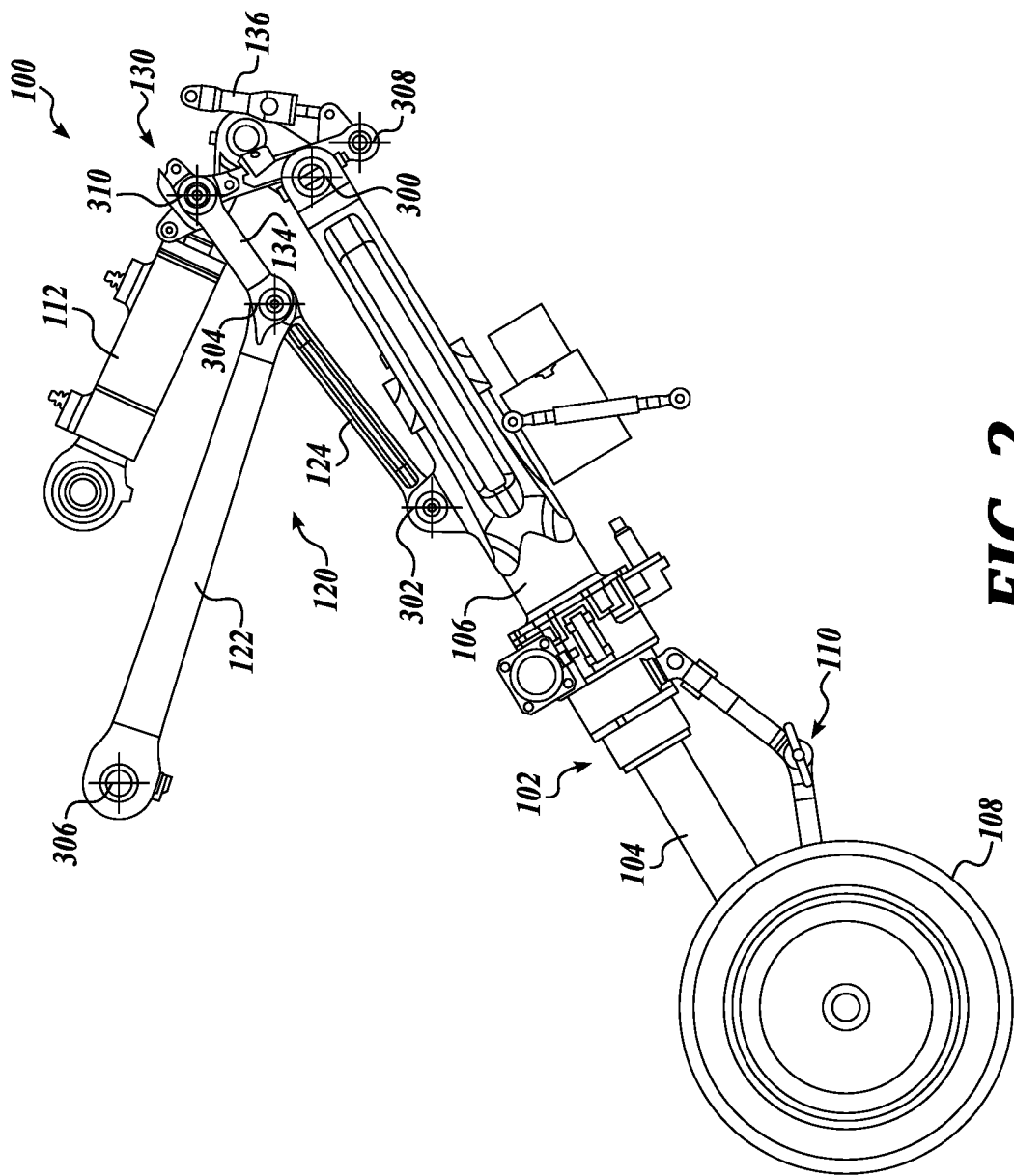
FIG. 2 shows a side view of the landing gear of FIG. 1, wherein the landing gear is between the deployed position and a stowed position.

As shown in FIGS. 4 and 5, the drag brace assembly 220 includes an elongate upper drag brace 222 and an elongate lower drag brace 224 similar to the upper drag brace 122 and lower drag brace 124, respectively, of FIGS. 1-3. The upper drag brace 222 is rotatably mounted to the aircraft about axis 306 and the lower drag brace 224 is rotatably mounted to the cylinder 106 about axis 302, which is parallel to axis 306. The upper drag brace 222 is rotatably coupled to the lower drag brace 224 about an axis 304 so that the upper and lower drag braces form a foldable linkage.

A downlock 250 selectively locks the drag brace assembly 220 and, therefore, the landing gear in the extended position. In any embodiment, the downlock 250 includes a first electromagnet 260 mounted to the upper drag brace 222, and a second electromagnet 270 mounted to the lower drag brace 224. As shown in FIG. 4, the first and second electromagnets 260, 270 are located on the upper and lower drag braces 222, 224, respectively, so that when the drag brace assembly 220 is in the extended position of FIG. 4, the first and second electromagnets are positioned proximate to each other.

The first electromagnet 260 and the second electromagnet 270 are in operable communication with a controller 280. The controller 280 is programmed to selectively control the polarity and strength of the electromagnetic field produced by each of the first and second electromagnets 260 and 270. As will be explained in further detail, because the polarity and strength of the magnetic fields generated by the electromagnets 260 and 270 is selectively varied by the controller 280, the electromagnets (1) attract each other to maintain the drag brace assembly 220 in the downlocked position and (2) repel each other to unlock the drag brace assembly 220 and enable the landing gear to move to the retracted position.

In some embodiments, the controller 280 includes a processor and memory. The memory may include computer readable storage media in read-only memory (ROM), random-access memory (RAM), and keep-alive memory (KAM), for example. The KAM may be used to store various operating variables or program instructions while the processor is powered down. The computer-readable storage media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, instructions, programs, modules, etc.

As used herein, the term processor is not limited to integrated circuits referred to in the art as a computer, but broadly refers to a microcontroller, a microcomputer, a microprocessor, a programmable logic controller, an application specific integrated circuit, other programmable circuits, combinations of the above, among others. Therefore, as used herein, the term "processor" can be used to generally describe these aforementioned components, and can be either hardware or software, or combinations thereof, that implement logic for carrying out various aspects of the present disclosure. Similarly, the terms "module" and "unit" can include logic that may be implemented in either hardware or software, or combinations thereof.

In some embodiments, the processor of the controller 280 executes instructions stored in memory. These instructions may include, for example, a set of algorithms, including resident program instructions stored in one of the storage mediums and executed to provide desired functions. In some embodiments, the set of instructions, when executed by the controller 280, carries out, for example, one or more of steps of, and in some embodiments all of the steps of, the method 400 set forth in FIG. 10.

In any embodiment, the controller 280 is in operative communication with a sensor 240 configured to send signals to the controller that correspond to the position of the landing gear 100. In any embodiment, the sensor 240 is a sensor or group of sensors on the aircraft that senses when the landing gear is in the extended position and the retracted position. In any embodiment, the sensor 240 is an existing sensor or group of sensors configured to sense the position of the landing gear throughout the extension and retraction motion.

In any embodiment, the controller 280 is programmed to control the downlock 250 to activate and de-activate according to the position of the landing gear 100. In any embodiment, the controller 280 is further programmed to control the electromagnetic downlock 250 to activate and de-activate according to whether the landing gear 100 is extending or retracting. More specifically, the controller 280 is programmed to energize the electromagnets 260 and 270 to provide an attractive force therebetween as the landing gear 100 approaches the deployed position. In any embodiment, the controller 280 is programmed to vary the amount of current provided to one or both electromagnets 260 and 270 so that the magnitude of the attractive force increases or decreases as the landing gear 100 approaches the deployed position. In any embodiment, the controller is programmed to de-energize the electromagnets 260 and 270 when the landing gear 100 is moving toward the stowed position and has moved past a predetermined position.

Figure 8:
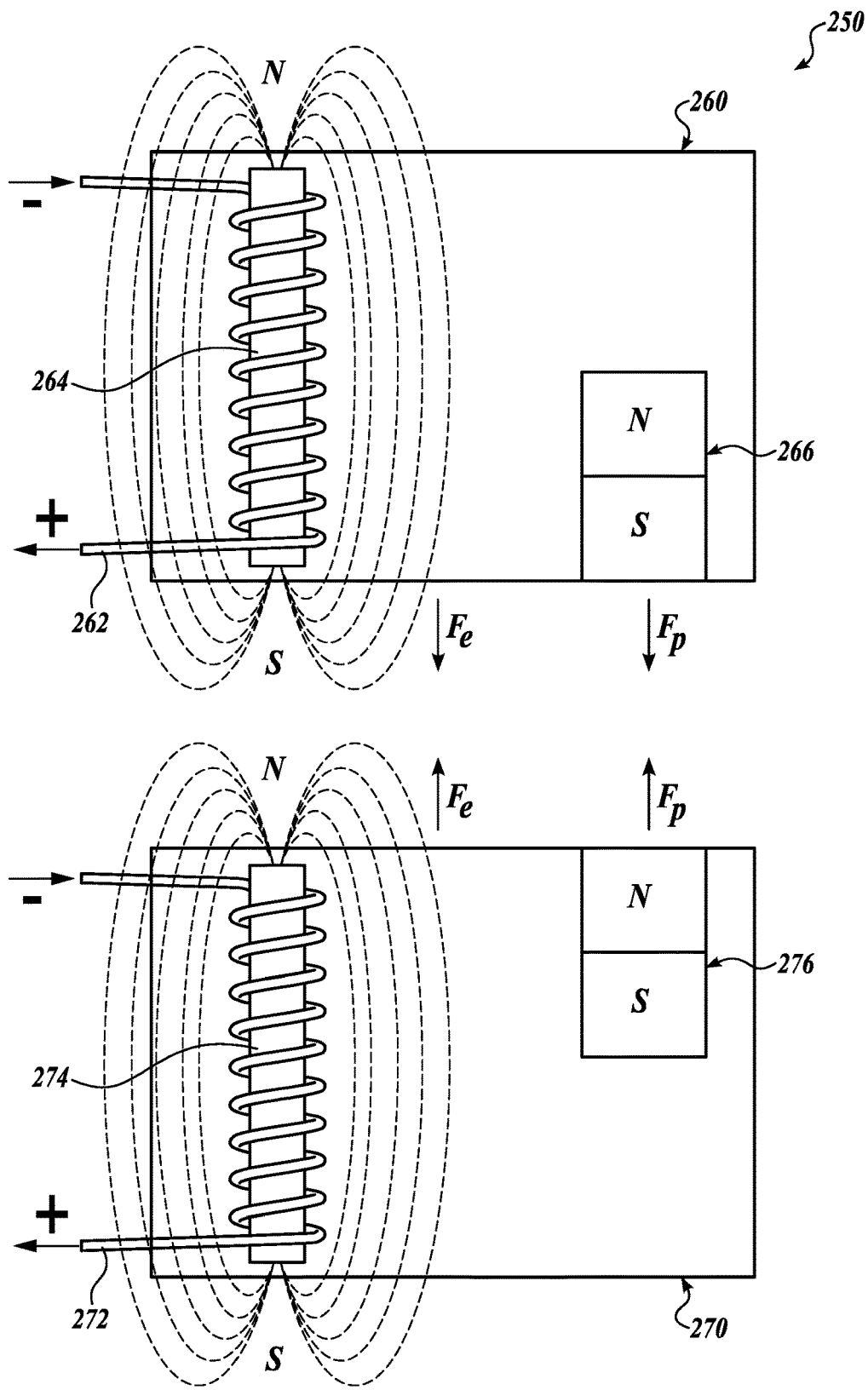
FIG. 8 shows a schematic view of a representative embodiment of an electromagnetic downlock according to aspects of the present disclosure, wherein the downlock is in the locked state.
Figure 9:
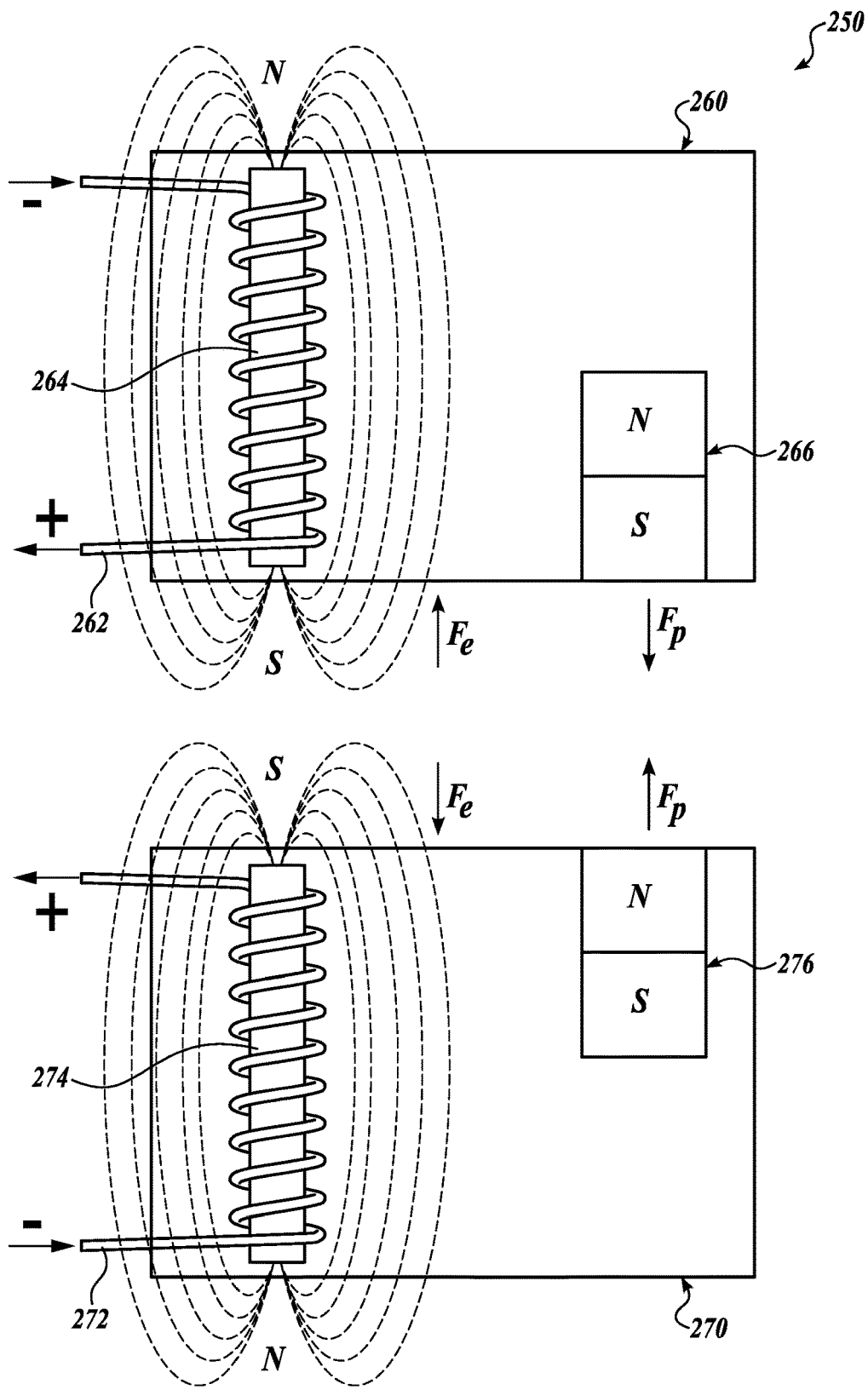
FIG. 9 shows a schematic view of the downlock of FIG. 8, wherein the downlock is in an unlocked locked state.

Referring now to FIGS. 8 and 9, embodiments of the first electromagnet 260 and the second electromagnet 270 are shown. In any embodiment, the first electromagnet 260 includes an electrically conductive wire 262 wound around a ferromagnetic core 264 to form a solenoid. The conductive wire 262 receives a flow of electrical current from a power source (not shown) to produce a magnetic field around the solenoid. The polarity of the first electromagnet 260 is reversible by reversing the direction of the current flowing through the conductive wire 262. In addition, the intensity, i.e., strength, of the magnetic field increases and decreases in proportion to the current flowing through the conductive wire. Accordingly, by controlling the direction and power of the electrical current supplied to the electromagnet 260, the controller 280 is able to control the polarity and strength of the magnetic field generated by the first electromagnet.

The first electromagnet 260 also includes a permanent magnet 266. In any embodiment, the permanent magnet 266 is integral with the first electromagnet 260. In any embodiment, the permanent magnet is separate from but mounted proximate to the first electromagnet 260.

Similar to the first electromagnet 260, the second electromagnet 270 includes an electrically conductive wire 272 wound around a ferromagnetic core 274. The second electromagnet 270 also includes an integral or associated permanent magnet 276.

Referring specifically to FIG. 8, the downlock 250 is shown in a locked state. In the locked state, the first electromagnet 260 is positioned proximate to the second electromagnet 270. The controller 280 controls the current supplied to the first and second electromagnets 260 and 270 such that the pole of one of the electromagnets is proximate to the opposite pole of the other electromagnet. That is, the north pole N of the first electromagnet 260 is proximate to the south pole S of the second electromagnet 270 or the south pole S of the first electromagnet is proximate to the north pole N of the second electromagnet. The magnetic fields produced by the location and relative polarity of the first and second electromagnets 260 and 270 generate a force Fe that attracts the first and second electromagnets to each other.

In the locked position, the permanent magnet 266 of the first electromagnet 260 is positioned proximate to the permanent magnet 276 of the second electromagnet 270. Further, the permanent magnets 266 and 276 are oriented so that the pole of one of the permanent magnets is proximate to the opposite pole of the other permanent magnet. As a result, the permanent magnets 266 and 276 generate a force Fp that attracts the first and second permanent magnets to each other.

The use of the disclosed combination of electromagnets 260 and 270 provide a "fail-secure" downlock 250. Unlike known fail-safe electromagnet locks, fail-secure electromagnetic downlocks continue to secure the landing gear 100 in the deployed position, even in the event of a failure of one or both electromagnets 260 and 270. Such failures can occur, for example, due to power failure, Foreign Object Damage (FOD), or other circumstances. In the case of the disclosed downlock 250, if one or both electromagnets fail, the force Fp generated by the permanent magnets 266 and 276 is sufficient to maintain the drag braces 122, 124 in the aligned position so that the landing gear 100 remains downlocked. That is, the attractive force Fp between (1) the permanent magnet 266 fixedly positioned relative to the fuselage and (2) the permanent magnet 276 fixedly positioned relative to a component of the landing gear is sufficient to maintain the landing gear in the deployed position, even in the absence of any further attractive force Fe of the electromagnets. In the event of downlock electromagnet failure, the landing gear actuator 112, which is typically hydraulic, is capable of providing sufficient force to overcome the attractive force Fp generated by the permanent magnets 266 and 276. As a result, while the downlock 250 will retain the landing gear 100 in the deployed position in the event that one or both electromagnets fail, a pilot is still able to stow the landing gear.

Referring now to FIG. 9, the downlock 250 is shown in an unlocked state as the landing gear 100 is about to move from the deployed position to the stowed position. To unlock the downlock 250, the controller 280 reverses the current in the coiled wire of one of the electromagnets 260 or 270. In the illustrated embodiment, the current is reversed in the coiled wire 272 of the second electromagnet 270; however, in other embodiments, the current is reversed in the coiled wire 262 of the first electromagnet 260.

Reversing the electrical current in the coil of one of the electromagnets reverses the polarity of that electromagnet. As a result, the pole of one electromagnet is proximate to the same pole of the other electromagnet, i.e., the north poles N of both magnets or the south poles S of both magnets are proximate to each other. The magnetic fields produced by the location and relative polarity of the first and second electromagnets 260 and 270 generate a force Fe that repels the first and second electromagnets from each other. This repellent force Fe, alone or in combination with the force of the landing gear actuator(s) 112 is sufficient to overcome the attractive force Fp of the permanent magnets so that the landing gear 100 is able to move toward the stowed position.

In addition to locking the landing gear 100 in the deployed position when the aircraft is on the ground supported by the landing gear, the disclosed downlock 250 also provides forces that supplement the forces supplied by the actuator 112 that drive the landing gear in both the extension and retraction phases. During landing gear 100 extension, the attractive force Fe of the electromagnets 260 and 270 pull the drag braces 122, 124 and, therefore, the landing gear 100 toward the deployed position during the end of the extension motion. Conversely, during the initial portion of the landing gear retraction, the repellent force Fe of the electromagnets 260 and 270 initially drives the drag braces 122, 124 toward the folded configuration, which drives the landing gear 100 toward the stowed position. The supplemental forces provided by the downlock 250 reduce the actuating force required from the actuator 112. As a result, a smaller actuator can be used, which reduces weight as well as space required in the wheel well.

It will be appreciated that the disclosed electromagnets 260 and 270 are exemplary only and should not be considered limiting. In this regard, embodiments of the downlock 250 can include any number or type of known electromagnets that incorporate permanent magnets and cooperate to provide a fail-secure electromagnetic downlock.

In another embodiment of a downlock, the second electromagnet is replaced by a second permanent magnet, which acts like an armature. When the downlock is locked and the first electromagnet is proximate to the second permanent magnet, the first solenoid and the first permanent magnet are both attracted to the second permanent magnet. When the downlock is switched to an unlocked state, the first solenoid is repelled by the first permanent magnet, while the first permanent magnet remains attracted to the second permanent magnet. Because the repelling force between the first solenoid and the second permanent magnet is greater than the attracting force between the first and second permanent magnets, the first electromagnet is repelled by the second permanent magnet. When the first electromagnet loses power, the attraction force between the first and second permanent magnets is sufficient to maintain function of the downlock until power is restored.

Referring back to FIGS. 4 and 5, embodiments of the disclosed downlock 250 provide a simplified, lightweight, reliable locking features to maintain the drag brace assembly 220 in the downlocked position. In any embodiment, the downlock 250 replaces the locking link assembly 130 (of FIGS. 1-3) completely, including the locking link actuator 136 and the springs. In any embodiment, the drag brace assembly 220 is used in conjunction with the locking link assembly 130, thereby reducing the forces required by the locking link actuator 136 and the springs, which allows for more compact and lightweight components.

Figure 6:
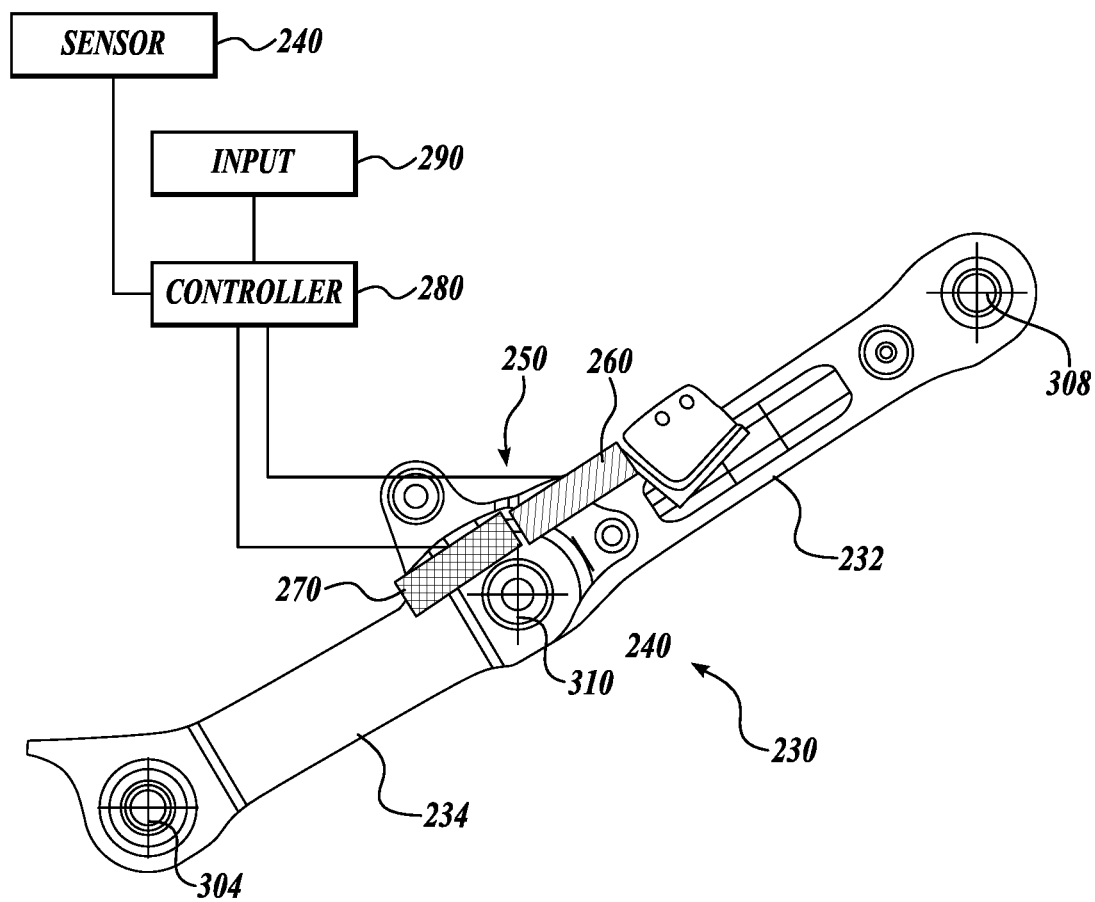
FIG. 6 shows a partially schematic side view of a representative embodiment of a locking link assembly for a retractable landing gear according to aspects of the present disclosure, wherein the locking link assembly is in a downlocked position corresponding to the landing gear being in the extended position of FIG. 1.
Figure 7:
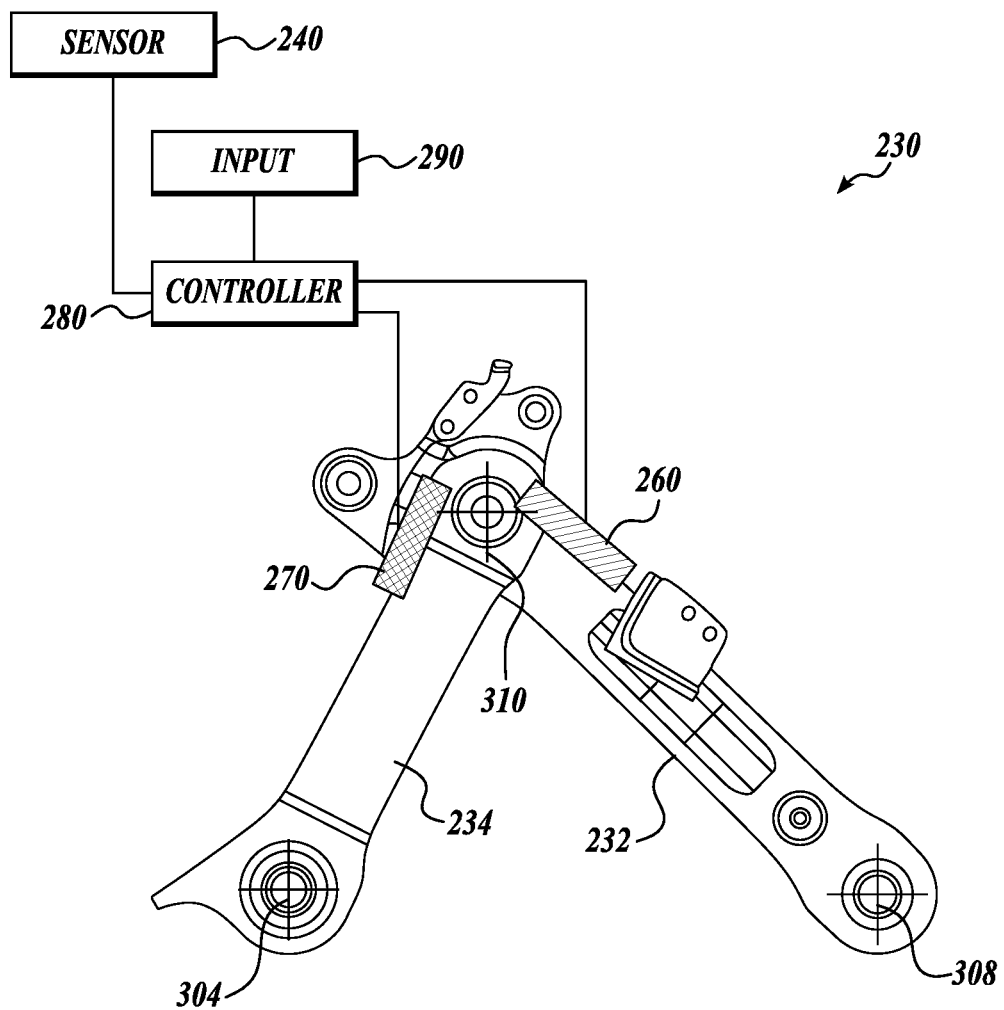
FIG. 7 shows a partially schematic side view of the locking link assembly of FIG. 6, wherein the locking link assembly is in a folded position corresponding to the landing gear being in the retracted position of FIG. 3.

FIGS. 6 and 7 show a representative embodiment of a locking link assembly 230 with a downlock 250 according to aspects of the present disclosure. In any embodiment, the locking link assembly 230 is used on the landing gear 100 of FIGS. 1-3 in place of the illustrated locking link assembly 130 to downlock the drag brace assembly 120.

Similar to the locking link assembly 130 of FIGS. 1-3, the locking link assembly 230 of FIGS. 6 and 7 includes an elongate upper locking link 232 configured for rotation at a first end about axis 308. A second end of the upper locking link 232 is rotatably coupled at a second end to a first end of a lower locking link 234 about axis 310. The second end of the lower locking ling 234 is rotatably coupled to the drag brace assembly 120 about axis 304, i.e., the axis about which the upper and lower drag braces 122, 124 are coupled to each other.

Instead of a locking link actuator and springs, the locking link assembly 230 includes an electromagnetic downlock 250 similar to the downlock 250 of previously described drag brace assembly 220. The downlock 250 of the locking link assembly 230? selectively locks the locking link assembly 230 and, therefore, the landing gear in the extended position. In any embodiment, the first electromagnet 260 is mounted to the upper locking link 232, and the second electromagnet 270 is mounted to the lower locking link 234. As shown in FIG. 6, the first and second electromagnets 260, 270 are located on the upper and lower locking links 232, 234, respectively, so that when the locking link assembly 230 is in the extended position of FIG. 4, the first and second electromagnets are positioned proximate to each other.

Similar to the previously described drag brace assembly 220, the first electromagnet 260 and the second electromagnet 270 of the locking link assembly 230 are in operable communication with a controller 280. In any embodiment, the controller 280 is in operable communication with a position sensor 240 and/or an input device 290. The downlock 250 operates in a manner similar to the downlock of the previously described drag brace assembly 220. The main difference is that the downlock 250 of the drag brace assembly 220 applies a locking force directly to the upper and lower drag braces 222, 224, and the downlock 250 of the locking link assembly 230 applies a locking force to the upper and lower locking links 232, 234 to prevent the drag brace assembly 120 from folding. With the drag brace assembly 120 fixed in the extended position, the landing gear 100 is downlocked. The electromagnets 260, 270 also selectively repel each other to unlock the locking link assembly 230 when the landing gear is to be retracted to the stowed position.

The locking links 232, 234 of the locking link assembly 230 are driven through the folding and unfolding motion by the drag brace assembly 120, and the attracting/repelling forces of the downlock 250 lock and unlock the locking link assembly. Accordingly, in any embodiment, the locking link assembly 230 does not include a locking link actuator 236. Thus, the locking link assembly 230 provides a simplified, lightweight, reliable locking configuration for downlocking the landing gear 100.

Figure 10:
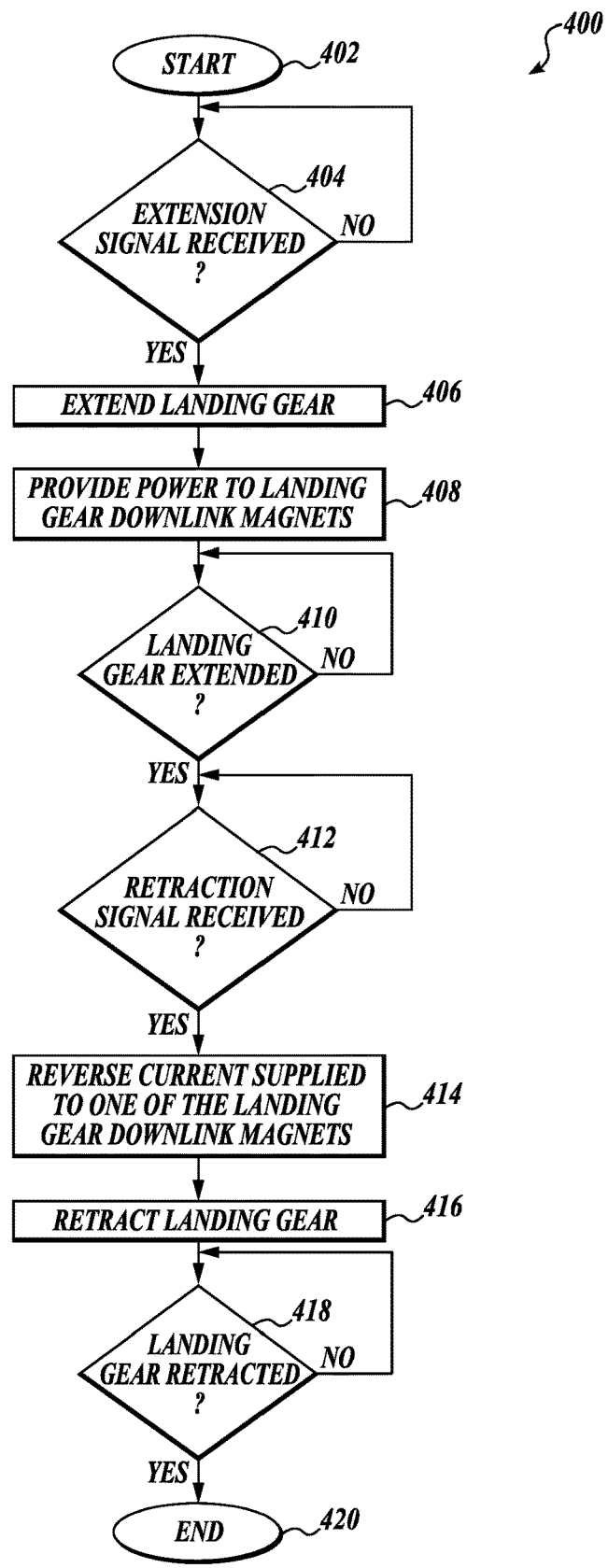
FIG. 10 shows a flow chart depicting a representative method of extending and retracting a landing gear with an electromagnetic downlock according to aspects of the present disclosure.

FIG. 10 shows a flow chart of a representative method 400 for extending and retracting a landing gear having an electromagnetic downlock 250 according to aspects of the present disclosure. The method 400 starts in block 402 with the landing gear 100 in the retracted position. The method 400 proceeds to block 404.

In block 404, the controller 280 determines if a signal has been received instructing extension of the landing gear ("an extension signal"). If an extension signal has not been received, the method 400 remains at block 404. When an extension signal is received, the method proceeds to block 406.

In block 406, the landing gear 100 begins extension. As the landing gear 100 continues to extend, the method 400 proceeds to block 408.

In block 408, the controller 280 controls a power source to energize the electromagnets 260 and 270. The electromagnets 260 and 207 are energized such that attractive forces are generated between electromagnets 260 and 270. The method 400 then proceeds to block 410.

In block 410, the controller 280 determines if extension of the landing gear 100 is complete. The method remains at block 410 until the landing gear 100 is fully extended. With the landing gear fully extended, the method 400 then proceeds to block 412.

In block 412, the landing gear is extended through landing, taxiing, and the next takeoff. The method remains at block 412 until the aircraft has taken off. After the aircraft has taken off, the controller 280 receives a signal indicating that the landing gear 100 is to be retracted. The method then proceeds to block 414.

In block 414, extension of the landing gear 100, the landing gear downlock 250 is disengaged by reversing a current to one of the landing gear downlock electromagnets 260, 270, thereby generating a repelling force between electromagnets 260 and 270.

In block 416, the downlock 250 has is unlocked and the landing gear 100 begins retracting toward the stowed position. The method 400 then moves to block 418.

In block 418, retraction of the landing gear 100 continues until the controller 280 receives a signal indicating that the landing gear has reached the stowed position. With the landing gear 100 in the stowed position, the method proceeds to block 420 and ends.

It will be appreciated that the disclosed embodiments are exemplary only and should not be considered limiting. In some embodiments, the size, number, position, and actuation of the landing gear and landing gear doors can vary within the scope of the present disclosure. Similarly, the disclosed downlock assemblies can by utilized to secure various embodiments of landing gear and landing gear doors in the stowed/closed positions. These and other variations are contemplated and should be considered within the scope of the present disclosure.

The present application may reference quantities and numbers. Unless specifically stated, such quantities and numbers are not to be considered restrictive, but exemplary of the possible quantities or numbers associated with the present application. Also, in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A landing gear system for a vehicle, comprising:
a landing gear coupled to a body of the vehicle and configured for reciprocating motion between a stowed position and a deployed position, the landing gear having a linkage with a first link rotatably coupled to a second link, the linkage being configured to reciprocate between a folded state when the landing gear is in the stowed position and an extended state when the landing gear is in the deployed position; and
a fail-secure downlock reciprocal between a locked state and an unlocked state, the downlock comprising:
a first electromagnet fixedly positioned relative to the first link, the first electromagnet including a first solenoid configured to generate a first electromagnetic field with a reversible polarity and a first permanent magnet; and
a second electromagnet fixedly positioned relative to a second link, the second electromagnet including a second solenoid configured to generate a second electromagnetic field with a reversible polarity and a second permanent magnet,
wherein the first electromagnet is proximate to the second electromagnet when the landing gear is in the deployed position, the first permanent magnet being attracted to the second permanent magnet, the first solenoid being attracted to the second solenoid when the downlock is in the locked state, and the first solenoid being repelled by the second solenoid when the downlock is in the unlocked state.

2. The landing gear system of claim 1, wherein the linkage is a drag brace rotatably coupled at a first end to the vehicle and at a second end to a landing gear component.

3. The landing gear system of claim 2, wherein the downlock maintains the drag brace in an extended position when the downlock is in the locked state, the landing gear being prevented from moving toward the retracted position when the drag brace is in the extended state.

4. The landing gear system of claim 3, wherein the downlock urges the drag brace toward the folded state when the downlock is in the unlocked state.

5. The landing gear system of claim 1, further comprising a controller in operable communication with the first and second electromagnets, the controller being programmed to reverse a current supplied to one of the first and second electromagnets to move the downlock from the locked state to the unlocked state.

6. The landing gear system of claim 5, wherein the downlock urges the drag brace toward the folded state when the downlock is in the unlocked state.

7. The landing gear system of claim 1, the landing gear including a drag brace rotatably coupled at a first end to the vehicle and at a second end to a landing gear component, the drag brace reciprocating between a folded position when the landing gear is in the stowed position and an extended position when the landing gear is in the deployed position, wherein the linkage is a locking link assembly coupled to the drag brace, wherein the locking link assembly prevents movement of the drag brace toward the folded position when the downlock is in the locked state.

8. The landing gear system of claim 7, wherein the locking link assembly urges the drag brace toward the folded position when the downlock is in the unlocked state.

9. The landing gear system of claim 8, further comprising a controller in operable communication with the first and second electromagnets, the controller being programmed to reverse a current supplied to one of the first and second electromagnets to move the downlock from the locked state to the unlocked state.

10. The landing gear system of claim 9, wherein the downlock urges the drag brace toward the folded position when the downlock is in the unlocked state.

11. The landing gear system of claim 1, wherein the first electromagnet repels the second electromagnet when the landing gear is in the deployed position and the downlock is in the unlocked state.

12. A landing gear assembly for a vehicle having a fuselage, comprising:
- a shock strut mounted to the fuselage for reciprocating movement between a stowed position and a deployed position,
- a drag brace having a first link rotatably coupled to a second link, an end of the first link being rotatably coupled to the shock strut and an end of the second link being rotatably coupled to the fuselage, the drag brace reciprocating between an extended state when the shock strut is in the deployed position and a folded state when the shock strut is in the stowed position; and
- a downlock configured to selectively retain the shock strut in the deployed position, the downlock comprising:
  - a first electromagnet and a first permanent magnet mounted to the first link;
  - a second electromagnet and a second permanent magnet mounted to the second link;
  - a power source configured to provide an electrical current to the first and second electromagnets; and
  - a controller programmed to selectively control a direction and power of the electrical current supplied to each of the first and second electromagnets,
- wherein the first and second electromagnets are attracted to each other when the downlock is in a locked state, and the first and second electromagnets are repelled from each other when the downlock is in an unlocked state.

13. The landing gear assembly of claim 12, wherein the first and second permanent magnets are attracted to each other, and a force repelling the first and second electromagnets is greater than a force attracting the first and second permanent magnets when the shock strut is in the deployed position and the downlock is in the unlocked state.

14. A landing gear system for a vehicle, comprising:
- a landing gear coupled to a body of the vehicle and configured for reciprocating motion between a stowed position and a deployed position, the landing gear having a linkage with a first link rotatably coupled to a second link, the linkage being configured to reciprocate between a folded state when the landing gear is in the stowed position and an extended state when the landing gear is in the deployed position; and
- a fail-secure downlock reciprocal between a locked state and an unlocked state, the downlock comprising:
  - a first electromagnet fixedly positioned relative to the first link, the first electromagnet including a first solenoid configured to generate a first electromagnetic field with a reversible polarity and a first permanent magnet; and
  - a second permanent magnet fixedly positioned relative to a second link and proximate to the first electromagnet when the landing gear is in the deployed position,
  - wherein the first permanent magnet is attracted to the second permanent magnet, the first solenoid is attracted to the second permanent magnet when the downlock is in the locked state, and the first solenoid is repelled by the second permanent magnet when the downlock is in the unlocked state.

15. The landing gear assembly of claim 14, wherein when the downlock is in the unlocked state, a repelling force between the first solenoid and the second permanent magnet is greater than an attracting force between the first and second permanent magnets.

\* \* \* \* \*